No. 694,609. Patented Mar. 4, 1902.
G. W. BROWN.
HOLDER FOR NON-FLUID LUBRICANT.
(Application filed July 15, 1901.)
(No Model.)
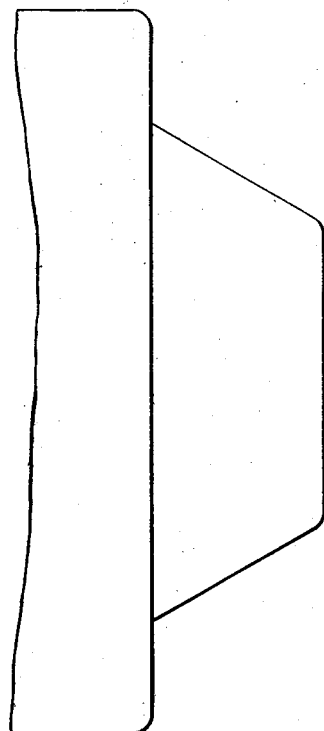
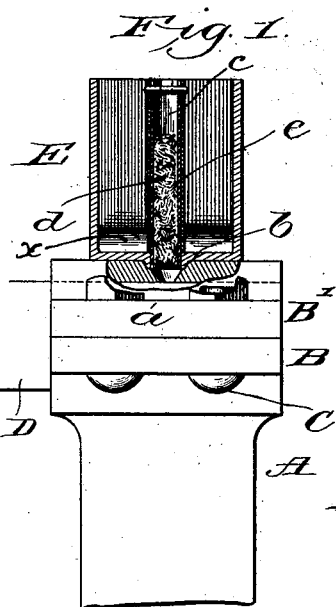
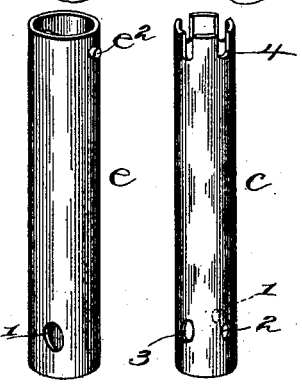
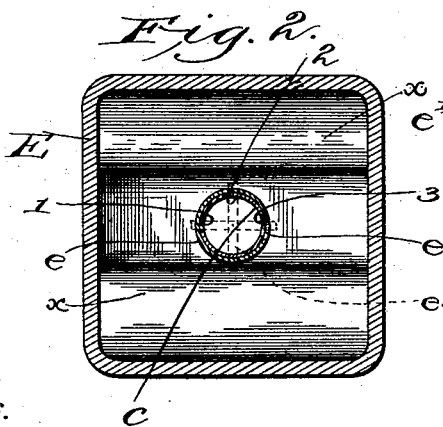
Witnesses.
W. C. Lunsford
A. O. Kaiser
Inventor.
George W. Brown
by Crosby Gregory
attys.
THE NORRIS PETERS CO., PHOTO-LITHO., WASHINGTON, D. C.

UNITED STATES PATENT OFFICE.

GEORGE WINTHROP BROWN, OF BOSTON, MASSACHUSETTS.

HOLDER FOR NON-FLUID LUBRICANT.

SPECIFICATION forming part of Letters Patent No. 694,609, dated March 4, 1902.

Application filed July 15, 1901. Serial No. 68,287. (No model.)

*To all whom it may concern:*

Be it known that I, GEORGE WINTHROP BROWN, a citizen of the United States, and a resident of Boston, in the county of Suffolk and State of Massachusetts, have invented an Improvement in Holders for Non-Fluid Lubricants, of which the following description, in connection with the accompanying drawings, is a specification, like characters on the drawings representing like parts.

This invention has for its object the production of a novel holder to contain non-fluid lubricant for use in connection with bearings for shafting, and more especially with the bearings for the shafts of electric and other high-speed motors commonly employed on street-railways. It is common to employ oil, which is always fluid, in a cup connected with the cap of a bearing, and oil is fed to the shaft as needed by capillary attraction, a wick, having one end immersed in the oil, rising from the oil and entering a tube of the cup containing the oil, the opposite end of the wick being led down to the bearing.

My improved holder is composed of a case open at the bottom and provided, preferably, with a suitable tip to enter a hole in the cap of the usual bearing. The shell contains a suitable feeding-tube in communication with the hole referred to, and the tube, having a suitable inlet, has drawn through it snugly a wick of felt or other suitable material which fully fills the diameter of the tube, and when the shell becomes heated by contact with the box, the latter being heated by the rapid rotation of the shaft in it, the non-fluid lubricant becomes fluid and runs through the inlet into the wick and thence slowly to the contact-surfaces of the shaft and bearing. To admit the fluid lubricant in desired quantities, I have provided the tube with a regulator, represented also as a tube surrounding the feeding-tube, said regulator having a hole which may be brought into alinement with any one of a plurality of holes in the lubricant-feeding tube. The regulator is represented as provided with a pin which may enter either of a series of slots in the feeding-tube to thereby lock the regulator in any desired position.

It is likewise desirable at times to supply a fluid lubricant to the bearing to be lubricated prior to the time that the said bearing may become heated sufficiently to liquify the non-fluid lubricant, and to this end the feeding-tube is made open at both ends, and the wick extends upward in the feeding-tube some distance, so as to permit the introduction of fluid lubricant into the top of the feeding-tube and yet prevent too-rapid feed of said liquid lubricant to the bearing.

Figure 1 shows part of a bearing and shaft with my novel holder applied thereto. Fig. 2 is a top view of the holder detached and the wick omitted. Fig. 3 shows the regulator detached, and Fig. 4 shows the feeding-tube detached.

Referring to the drawings, let A represent a suitable standard supporting in usual manner the under part B of a box or bearing, the cap or upper part B' being secured to the under part by suitable bolts C. The cap B' has a suitable inlet $a$ for the lubricant used to lubricate the shaft D of the electric or any other high-speed motor.

My holder consists, essentially, of a case E, having a hole in its under side, from which projects downwardly a suitable tip, as $b$, the bottom wall of the said case E being beveled or inclined, as at $x$, toward the hole, so that as the lubricant becomes fluid, as hereinafter described, it will run toward the said hole or center of the case E, as will be evident from Figs. 1 and 2. The holder has secured in it a suitable feeding-tube, as $c$, shown as provided with a plurality of inlets, supposed to be four in number and of different area. This feeding-tube has drawn through it a wick, as $d$, which fills substantially closely the interior diameter of the tube, the wick being composed of felt or any other usual or suitable fibrous material. The feeding-tube is surrounded by a regulator $e$, provided at its lower end with a hole $e'$ and, as shown, at its upper end with a pin $e^2$. The regulator $e$ may be raised and lowered upon the feeding-tube, and when raised it may be rotated more or less to place the hole $e'$ opposite any one of the inlets 1, 2, or 3 of the feeding-tube, and thereafter the regulator $e$ may be lowered, and the pin $e^2$ will enter one or the other of a series of notches 4 in the upper end of the feeding-tube, said pin and notches constituting one form of locking device to retain the regulator in position to admit the lubricant into either one of the inlets referred to.

The lubricant with which the shell E is filled will be composed of oil and grease mixed to such consistency that it will not be fluid and run through the wick to the bearing, except when the shell becomes heated by contact with the cap, the latter being heated by the action of the rapidly-running shaft D in the bearing. The feeding-tube has the upper and lower ends thereof made open, so that liquid lubricant may be applied directly to the feeding-tube to lubricate the bearing, if desired, prior to the time when said bearing becomes heated sufficiently to liquefy the non-fluid lubricant.

The shell may be readily detached from the cap and a filled shell be readily substituted for it, and when the shaft D is at rest the lubricant quickly assumes such consistency that it will not run, and hence there is no waste of lubricant while the shaft may be standing at rest in its bearing.

Having fully described my invention, what I claim as new, and desire to secure by Letters Patent, is—

1. A case to contain a non-fluid lubricant, a feeding-tube having an inlet in its side wall and sustained within said case, said case having the bottom wall thereof inclined or beveled toward said feeding-tube, said feeding-tube being open at its upper and lower ends and in communication with an opening of a shaft-bearing, by which bearing the case holding the non-fluid lubricant is adapted to be heated, a wick filling the diameter of said tube at its lower end, and a regulator coacting with the feeding-tube to permit the flow of lubricant from the case through the side wall of the feeding-tube after said lubricant has become fluid through the heating of the bearing and case, and whereby a liquid lubricant may be introduced to the bearing directly through the feeding-tube.

2. A case to contain a non-fluid lubricant and having an opening in its bottom, a feeding-tube having a plurality of inlets in its side wall and in communication with the opening in the bottom of the case, a wick substantially filling the feeding-tube at its lower end and preventing direct movement of the non-fluid lubricant from the case through the feeding-tube and regulating the flow of the lubricant after the bearing and case have become heated sufficiently to render the lubricant fluid, and a regulator coating with the feeding-tube to permit the lubricant when in fluid condition to enter one or the other of the inlets, and locking means for the regulator, said case being also provided with a bottom having a bevel or incline directed toward the opening in the feed-tube, said feeding-tube being open at its ends to permit the direct application of a liquid lubricant through the feeding-tube.

3. A case to contain a non-fluid lubricant and having an opening in its bottom, a feeding-tube having a plurality of inlets and in communication with the opening in the bottom of the case, a wick substantially filling the feeding-tube at its lower end and preventing direct movement of the non-fluid lubricant from the case through the feeding-tube and regulating the flow of the lubricant after the bearing and case have become heated sufficiently to render the lubricant fluid, said feeding-tube being provided with a series of notches, and a regulator coacting with said feeding-tube to permit the lubricant when in fluid condition to enter one or the other of the inlets in the feeding-tube, said regulator being provided with a pin to engage the notches in the feeding-tube to lock the regulator in operative position, said feeding-tube being open at its upper and lower ends as and for the purpose described.

In testimony whereof I have signed my name to this specification in the presence of two subscribing witnesses.

GEORGE WINTHROP BROWN.

Witnesses:
   GEO. W. GREGORY,
   EDITH M. STODDARD.